(12) United States Patent
Sato et al.

(10) Patent No.: US 7,694,052 B2
(45) Date of Patent: Apr. 6, 2010

(54) PROCESSING APPARATUS AND PROCESSING MODULE

(75) Inventors: Fuyuta Sato, Fukuoka (JP); Naoki Fukuda, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 60 days.

(21) Appl. No.: 11/979,270

(22) Filed: Oct. 31, 2007

(65) Prior Publication Data
US 2008/0256277 A1 Oct. 16, 2008

(30) Foreign Application Priority Data
Oct. 31, 2006 (JP) ............................. 2006-296911

(51) Int. Cl.
*G06F 13/00* (2006.01)
(52) U.S. Cl. ..................................... 710/110; 710/106
(58) Field of Classification Search ................ 710/110, 710/105, 106, 104; 711/118, 147
See application file for complete search history.

(56) References Cited

U.S. PATENT DOCUMENTS

| | | | | |
|---|---|---|---|---|
| 5,586,297 | A * | 12/1996 | Bryg et al. ................... | 711/143 |
| 5,745,707 | A * | 4/1998 | Takahashi .................... | 710/110 |
| 5,920,891 | A * | 7/1999 | Steinbach et al. ............ | 711/146 |
| 6,314,491 | B1 * | 11/2001 | Freerksen et al. ........... | 711/124 |
| 6,449,671 | B1 * | 9/2002 | Patkar et al. ................. | 710/107 |
| 6,725,307 | B1 * | 4/2004 | Alvarez et al. .............. | 710/110 |

FOREIGN PATENT DOCUMENTS

| | | |
|---|---|---|
| EP | 1 262 875 A1 | 12/2002 |
| EP | 1 684 181 A2 | 7/2006 |
| JP | 7-225737 | 8/1995 |
| JP | 7-282023 | 10/1995 |
| WO | WO 2004/029812 A2 | 4/2004 |

OTHER PUBLICATIONS

Communication from the European Patent Office mailed on Nov. 27, 2009 in the related European patent application No. 07 020 897.0.

* cited by examiner

*Primary Examiner*—Mark Rinehart
*Assistant Examiner*—Trisha Vu
(74) *Attorney, Agent, or Firm*—Staas & Halsey LLP

(57) ABSTRACT

A processing apparatus has a master processing module and a plurality of slave processing modules. The master processing module has a master recording unit and a slave recording unit recording part of the data recorded in the master recording unit. The slave processing modules access the master processing module when it is necessary to access the data recorded in the master recording unit. When the data to be accessed from one slave processing module is recorded in the slave recording unit, the master processing module transmits the data to be accessed, from the slave recording unit to the one slave processing module. In the processing apparatus such as a base transceiver station communicating with transceivers such as mobile telephones, a reduction in the overall cost of the apparatus and an efficient internal communication are realized, and the overall processing time is reduced.

8 Claims, 8 Drawing Sheets

CASE 1

CASE 4

CASE 2

CASE 5

CASE 3

CASE 6

PROCESSING APPARATUS AND PROCESSING MODULE

CROSS-REFERENCE TO RELATED APPLICATIONS

This Nonprofessional application claims priority under 35 U.S.C. §119(a) to Japanese Patent Application No. 2006-296911 filed in Japan on Oct. 31, 2006, the entire contents of which are hereby incorporated by reference.

BACKGROUND

1. Field of the Invention

The present invention relates to a processing apparatus including a master processing module and a plurality of slave processing modules connected to the master processing module, and relates also to a processing module included in the processing apparatus. In particular, the present invention relates to a processing apparatus and a processing module in which the overall cost of the cache memories of the processing apparatus is reduced and the overall processing speed of the processing apparatus is improved.

2. Description of Related Art

In recent years, the mobile telephone service has expanded, and wireless networks where enormous amounts of data such as sounds and images are transmitted and received have been spreading. Therefore, a base transceiver station has been required that is capable of coping with the upsurge in traffic volume resulting from the expansion of the mobile telephone service and the spread of wireless networks. With this being the situation, a processing apparatus formed of a multiprocessor using one master processing module having a shared memory and a plurality of slave processing modules under the control of the master processing module is used as a base transceiver station.

FIG. 1 is a block diagram conceptually showing the structure of a conventional processing apparatus. In FIG. 1, reference numeral 1000 represents the processing apparatus used as a base transceiver station. The processing apparatus 1000 includes one master processing module 1100 and a plurality of slave processing modules 1200. The master processing module 1100 and the slave processing modules 1200 are interconnected by connection cables constituting a bus topology.

The master processing module 1100 includes a CPU 1110 and a shared memory 1120. Each of the slave processing modules 1200 includes a CPU 1210, a cache memory 1220, and a management table 1230 indicating the contents recorded in the cache memory 1220. In the cache memory 1220 included in each slave processing module 1200, part of the data recorded in the shared memory 1120 of the master processing module 1100 is recorded.

When it is necessary for a slave processing module 1200 to access the data recorded in the shared memory 1120, the slave processing module 1200 determines whether the necessary data is recorded in its own cache memory 1220 or not by referring to its own management table 1230. When the necessary data is recorded in its own cache memory 1220, the slave processing module 1200 accesses the data recorded in its own cache memory 1220. When the necessary data is not recorded in its own cache memory 1220, the slave processing module 1200 acquires the communication right (bus use right), and then, accesses the master processing module 1100, more specifically, accesses the data recorded in the shared memory 1120 included in the master processing module 1100. The result of the access is reflected in the cache memories 1220 of all the slave processing modules 1200.

Such a system is disclosed, for example, in Japanese Patent Application Laid-Open No. H07-225737.

SUMMARY

In the conventional processing apparatus as described above, since each of the slave processing modules has a cache memory, the overall cost of the apparatus is increased.

Moreover, in the conventional processing apparatus, in order that the data recorded in the shared memory included in the master processing module coincides with the data recorded in the cache memories included in the slave processing modules, the result of a data change in the shared memory of the master processing module must simultaneously be reflected in the cache memories of the slave processing modules, so that the connection is limited to the bus topology in which a plurality of slave processing modules are multi-connected by one bus. Further, in the bus topology, the number of slave processing modules that can be connected to the master processing module is limited because of the limitation of the electrical condition, and when an abnormality occurs on the bus, this causes a failure to all the communications.

In addition, in the conventional processing apparatus, since a plurality of slave processing modules are multi-connected by the bus, until one slave processing module having acquired the communication right accesses the shared memory of the master processing module, reads the data recorded in the shared memory and releases the communication right, and the result of the access is reflected in the cache memories of the slave processing modules, the other slave processing modules are forced to wait to access the shared memory. Consequently, the overall processing time is increased.

In the conventional processing apparatus, when a plurality of slave processing modules access the same data recorded in the shared memory of the master processing module, after one slave processing module accesses the data and the result thereof is reflected in the cache memories of all the slave processing modules, another slave processing module waiting to access the data acquires the communication right. However, in this case, since the slave processing module newly acquiring the communication right accesses the shared memory of the master processing module although the necessary data is reflected in the cache memories of all the slave processing modules, the overall processing time is increased.

The present invention is made in view of such circumstances, and a principal object thereof is to provide a processing apparatus with which a reduction in the overall cost of the apparatus can be realized by adopting a structure in which the cache memory conventionally provided in each slave processing module is provided only in the master processing module and it is unnecessary to provide the cache memory in each slave processing module, and a processing module included in the processing apparatus.

Another object of the present invention is to provide a processing apparatus in which not only the bus topology but also the star topology can be formed, a large number of slave processing modules can therefore be added compared to when the bus topology is formed, a system resistant to communication failures compared to when the bus topology is formed can be constructed, and unlike when the bus topology is formed, even while one slave processing module is accessing the master processing module, the bus is not monopolized and an efficient internal communication can be realized, and a processing module included in the processing apparatus.

Yet another object of the present invention is to provide a processing apparatus in which since the slave processing modules access slave recording means, having a high processing speed, of the master processing module, the overall processing time can be reduced.

Still another object of the present invention is to provide a processing apparatus in which since it is unnecessary to reflect the data in master recording means of the master processing module in the cache memories of the plurality of slave processing modules, the overall processing time can be reduced.

A processing apparatus according to a first aspect is a processing apparatus comprising a master processing module and a plurality of slave processing modules connected to the master processing module, characterized in that the master processing module includes master recording means for recording data required for processing and slave recording means for recording part of the data recorded in the master recording means; each of the slave processing modules includes means for accessing the master processing module when it is necessary to access the data recorded in the master recording means; and the master processing module further includes means for transmitting, when the data to be accessed from any of the plurality of slave processing modules is recorded in the slave recording means, the data recorded in the slave recording means to the slave processing module having accessed the master processing module.

A processing apparatus according to a second aspect is a processing apparatus of the first aspect, wherein the master processing module further includes means for transmitting, when the data to be accessed is not recorded in the slave recording means, the data recorded in the master recording means to the slave processing module having accessed the master processing module, and means for recording in the slave recording means the data having been transmitted to the slave processing module.

A processing apparatus according to a third aspect is a processing apparatus of the first or second aspect, further comprising: a table recording information associated with the data recorded in the slave recording means, and means for determining whether the data to be accessed is recorded in the slave recording means or not for the access from the salve processing module based on the information recorded in the table.

A processing apparatus according to a fourth aspect is a processing apparatus of any one of first through third aspects, wherein the processing apparatus is a base transceiver station communicating with a transceiver.

The processing apparatus according to the first through fourth aspects comprises a master processing module and a plurality of slave processing modules connected to the master processing module. The master processing module includes master recording means used as a shared memory for recording data required for processing and slave recording means as a cache memory for recording part of the data recorded in the master recording means. One slave processing module accesses the master processing module when it is necessary to access the data recorded in the master recording means, and when the data to be accessed from the one slave processing module is recorded in the slave recording means, the master processing module transmits the data recorded in the slave recording means to the one slave processing module.

According to the first through fourth aspects, since it is unnecessary to provide a cache memory in any of a plurality of slave processing modules, the structure of the slave processing modules provided in a large number is simplified, so that a reduction in the overall cost of the system can be realized.

Moreover, according to the first through fourth aspects, it is unnecessary that the data recorded in the master recording means provided in the master processing module be simultaneously reflected in all the plurality of slave processing modules. Consequently, since the system can be configured not only by forming the bus topology but also by forming the star topology, the degree of freedom of the design of the system configuration can be increased. Further, when the system is configured by forming the star topology, since a situation never arises in which a communication failure occurring on the bus affects all the communications which situation can arise when the bus topology is formed, a system resistant to communication failures can be constructed. Further, unlike when the bus topology is formed, it never occurs that the bus is monopolized by an access to the master processing module from one slave processing module. Since this enables a plurality of slave processing modules to simultaneously access the master processing module, the efficiency of communication is increased, and the overall processing time is reduced.

Further, according to the first through fourth aspects, since the slave processing modules access the slave recording means, having a high processing speed, of the master processing module, the overall processing time can be reduced.

According to the first through fourth aspects, since it is unnecessary that the data in the master recording means of the master processing module be reflected in the cache memories of all the plurality of slave processing modules, the overall processing time can be reduced.

The processing apparatus of the second aspect, even if data is not recorded in the slave recording means, can continue a processing by using data recorded in the master recording means and update recorded contents of the slave recording means.

The processing apparatus of the third aspect can determine easily recording means to be accessed by using the table recording information associated with the data recorded in the slave recording means.

The processing apparatus of the fourth aspect may be used as a base transceiver station communicating with transceivers such as mobile telephones.

According to the processing modules of the fifth through eighth aspects, the master processing module of the processing apparatuses of the first through fourth aspects as described above can be realized.

The above and further objects and features of the invention will more fully be apparent from the following detailed description with accompanying drawings.

DETAILED DESCRIPTION

Figure 1:
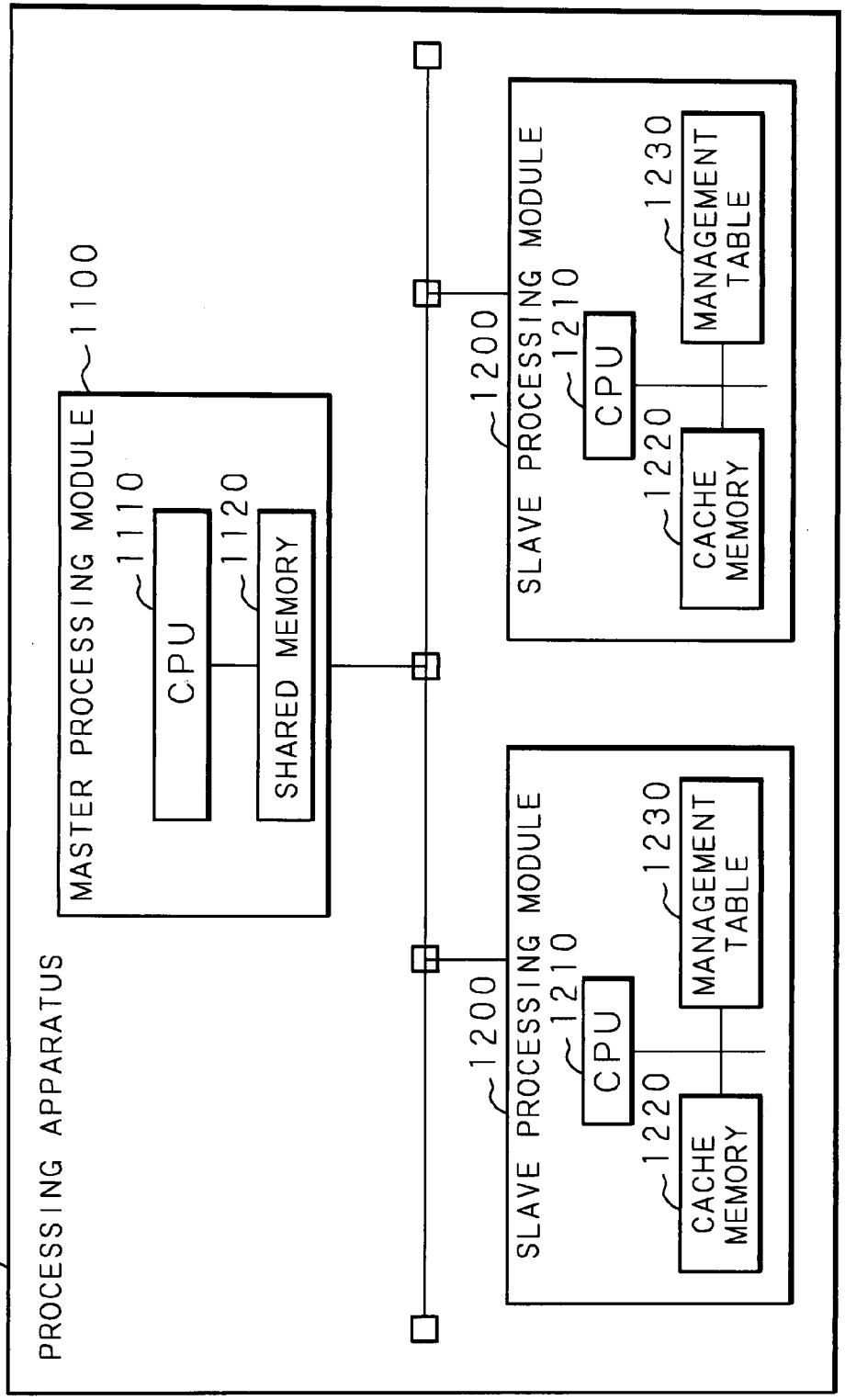
FIG. 1 is a block diagram conceptually showing the structure of the conventional processing apparatus.
Figure 2:
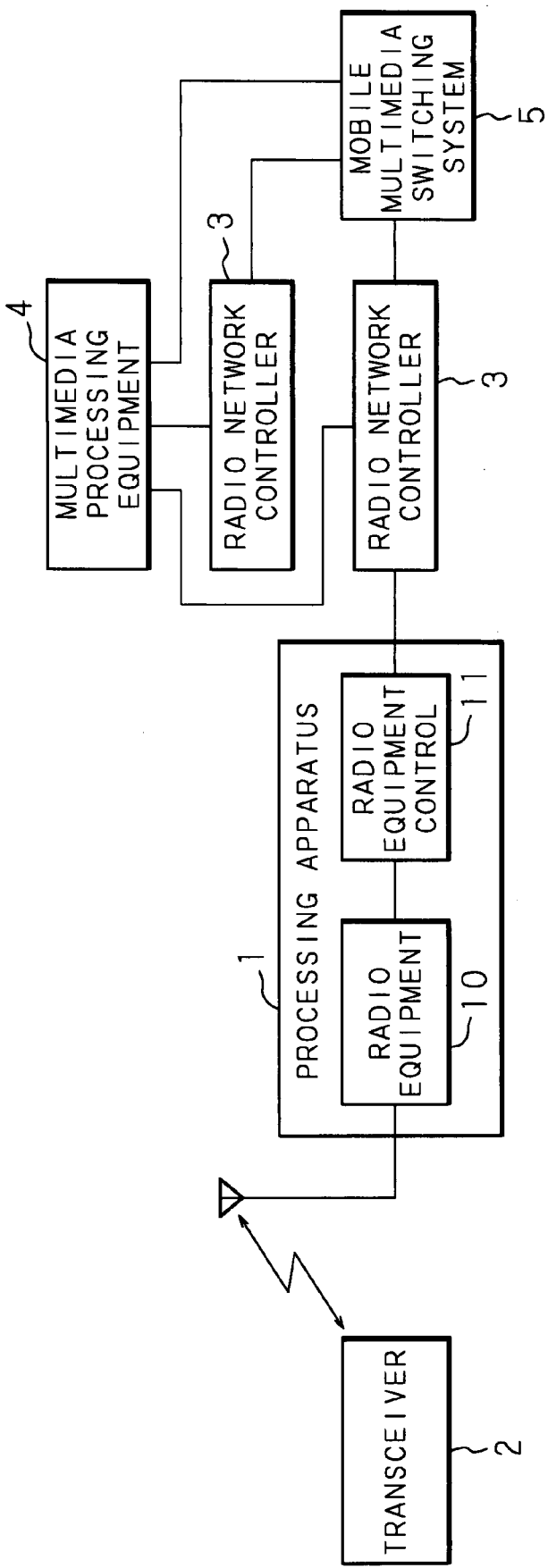
FIG. 2 is a block diagram showing an example of the structure of a communication system using a processing apparatus of the present invention.

Hereinafter, the present invention will be described in detail based on the drawings showing embodiments thereof. FIG. 2 is a block diagram showing an example of the structure of a communication system using a processing apparatus of the present invention.

In FIG. 2, reference numeral 1 represents the processing apparatus of the present invention. The processing apparatus 1 functions as a base transceiver station (BTS) communicating with a transceiver 2 such as a mobile telephone. The processing apparatus 1 includes radio equipment (RE) 10 that communicates with the transceiver 2 through an antenna and a radio equipment control 11 that controls the radio equipment 10. The radio equipment 10 and the radio equipment control 11 are connected by a communication cable such as a fiber-optic cable. Moreover, the radio equipment control 11 has a shelf accommodating a plurality of modules, and realizes various functions by activating the modules.

The processing apparatus 1 is connected to various apparatuses and systems such as multimedia processing equipment (MPE) 4 and a mobile multimedia switching system (MMS) 5 through a radio network controller (RNC) 3.

Figure 3:
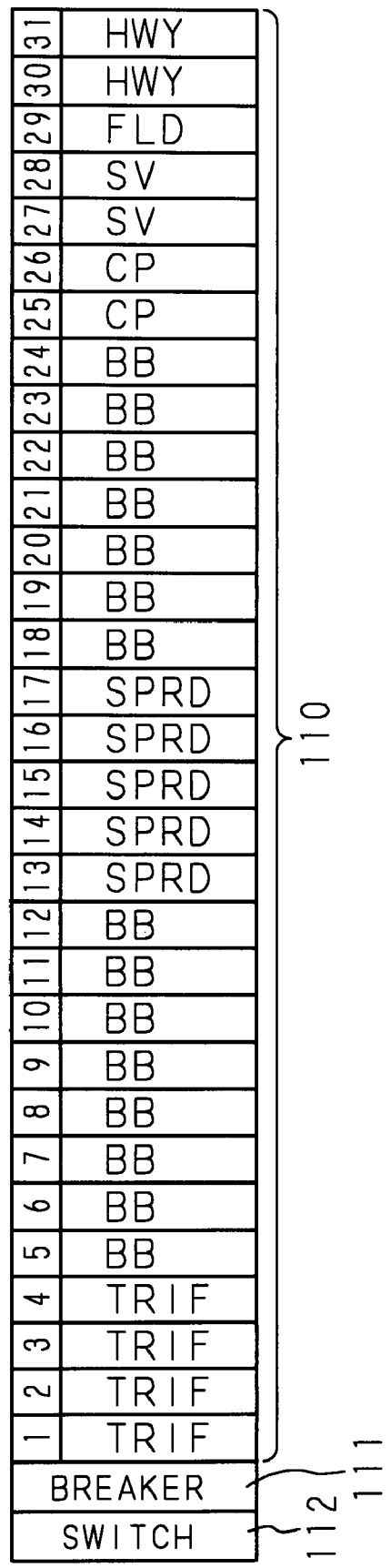
FIG. 3 is a block diagram showing an example of the structure of the processing apparatus of the present invention.

FIG. 3 is a block diagram showing an example of the structure of the processing apparatus 1 of the present invention. Here, FIG. 3 shows the shelf of the radio equipment control 11 included in the processing apparatus 1.

The shelf has various mechanisms such as slots 110 accommodating various card-type modules that realize various functions, a breaker 111 used for controlling the electric power distribution, and a switch 112 opening and closing the path of the signals transmitted and received between the modules and to and from another apparatus. Examples of the modules accommodated in the slots 110 include a TRIF card, a radio signal error correction (BB) card, a spread (SPRD) card, a processor (CP) card, a file loading (FLD) card, a highway (HWY) card, and an SV card. As the modules realizing their respective functions, one or a plurality of modules are used according to the throughput or the significance. When a plurality of modules are used to realize one function, the processing contents may be distributed to the modules or a redundant structure in which some are used as emergency modules may be adopted.

The SV card functions as the master processing module that executes various processings such as the monitoring, management, and control of the operational statuses of the other modules. The SV card is connected to slave processing modules such as the processor card, the highway card, and the file loading card, and transmits and receives various pieces of information to and from the slave processing modules.

Figure 4:
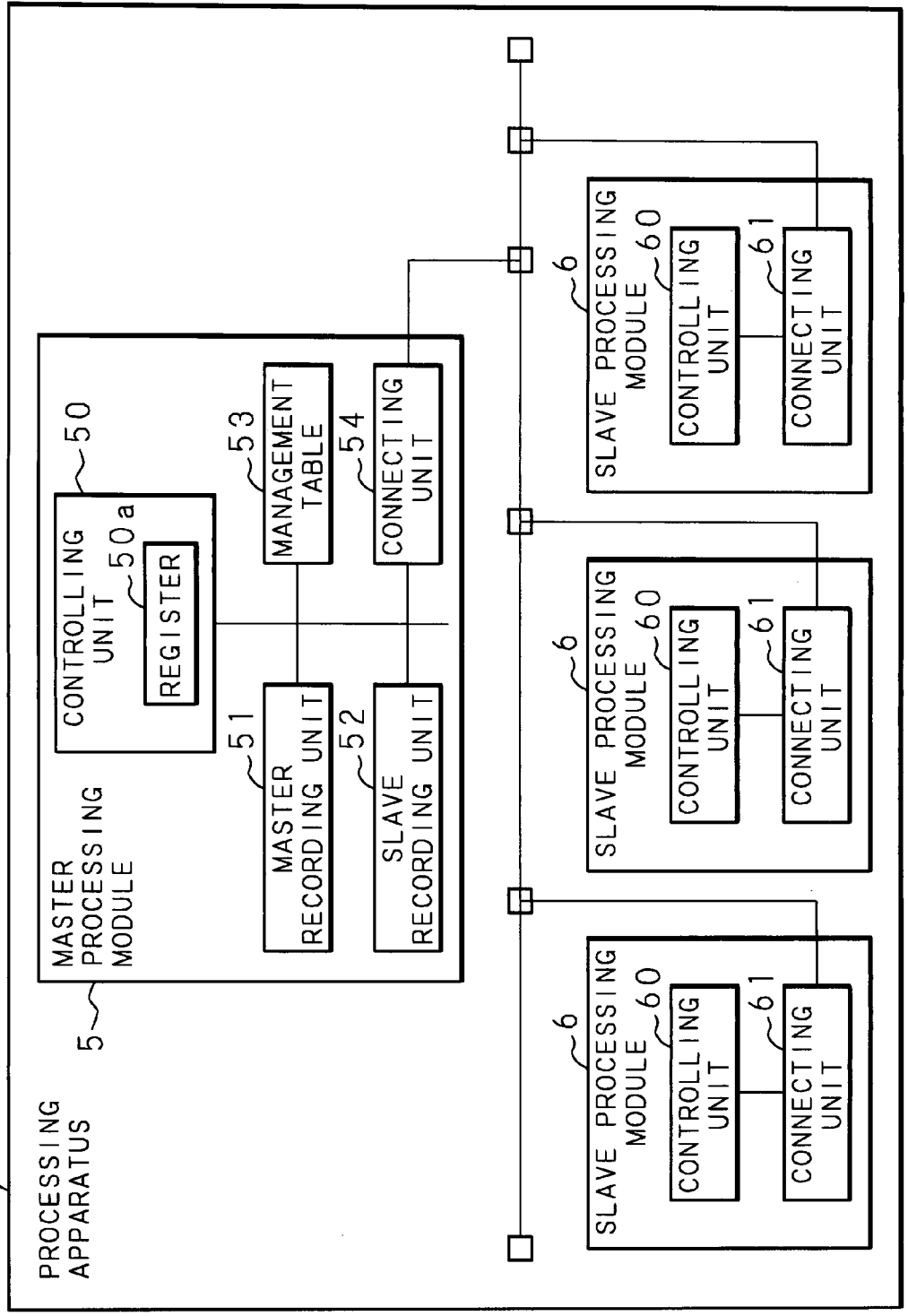
FIG. 4 is a block diagram conceptually showing an example of the structure of modules included in the processing apparatus of the present invention.

FIG. 4 is a block diagram conceptually showing an example of the structure of the modules included in the processing apparatus 1 of the present invention. In FIG. 4, reference numeral 5 represents the master processing module as which the SV card is used. To the master processing module 5, slave processing modules 6 such as a processor card, a highway card, and a file loading card are connected by connection cables constituting a bus topology.

The master processing module 5 includes: a controlling unit 50 such as a CPU that controls the entire module; a master recording unit 51 used as the shared memory for recording the data necessary for the processing by the master processing module 5 itself and the slave processing modules 6; a slave recording unit 52 used as the cache memory for recording part of the data recorded in the master recording unit 51; a management table 53 for recording information associated with the data recorded in the master recording unit 51 and the slave recording unit 52; and a connecting unit 54 connecting to the slave processing modules 6 through an internal bus.

The controlling unit 50 includes a register 50a of a first-in first-out (FIFO) format that manages instructions based on accesses from the slave processing modules 6 as a queue. The controlling unit 50 records instructions such as Read based on the accepted accesses in the register 50a as a queue, and executes the instructions in the order in which they are accepted. In the management table 53, various pieces of information are recorded such as memory addresses indicating the recording positions associated with the data recorded in the master recording unit 51 and the condition of the data, and memory addresses indicating the recording positions associated with the data recorded in the slave recording unit 52 and the condition of the data. The data recorded in the slave recording unit 52 may be recorded in such a manner as to divide the data into groups associated with the slave processing modules 6, respectively.

Each of the slave processing modules 6 includes a controlling unit 60 such as a CPU that controls the entire module and a connecting unit 61 that connects to the master processing module 5 through the internal bus.

Figure 5:
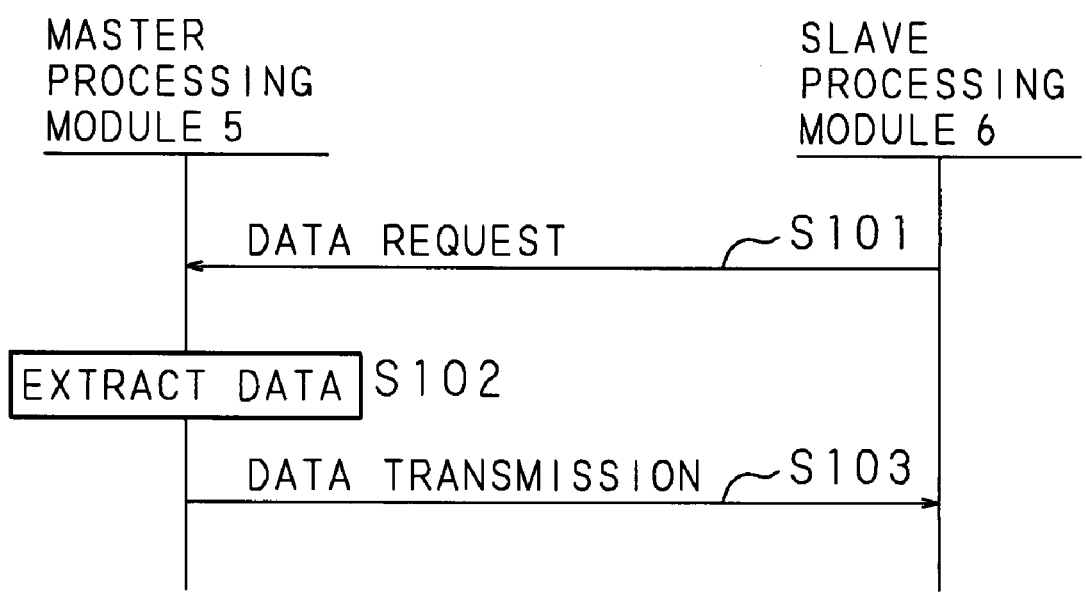
FIG. 5 is a sequence diagram showing an example of the processing performed between a master processing module and a slave processing module included in the processing apparatus of the present invention.

Next, the processings of the modules included in the processing apparatus 1 of the present invention will be described. FIG. 5 is a sequence diagram showing an example of the processing performed between the master processing module 5 and one slave processing module 6 included in the processing apparatus 1 of the present invention.

When it becomes necessary for one slave processing module 6 to access some data recorded in the master recording unit 51 of the master processing module 5 through the control by the controlling unit 60, a data request asking for the transmission of the necessary data is transmitted from the connecting unit 61 as an access to the master processing module 5 (S101). At step S101, the slave processing module 6 having made the data request monopolizes the internal bus while the data request is being transmitted from the slave processing module 6 to the master processing module 5.

The master processing module 5 accepts the data request by the connecting unit 54 as an access from the slave processing module 6 through the control by the controlling unit 50. The master processing module 5 extracts the data specified by the data request from the master recording unit 51 or the slave recording unit 52 (S102), and transmits the extracted data from the connecting unit 54 to the slave processing module 6 having made the data request (S103). At step S102, the internal bus is released from the monopolized condition while the processing only by the master processing module 5 is being performed after the completion of acceptance of the data request. However, at step S103, the slave processing module 6 having made the data request monopolizes the internal bus again while the data is being transmitted from the master processing module 5 to the slave processing module 6 having made the data request.

The slave processing module 6 having made the data request accepts the data transmitted from the master processing module 5 by the connecting unit 61 through the control by the controlling unit 60, and executes the processing based on the accepted data.

Figure 6:
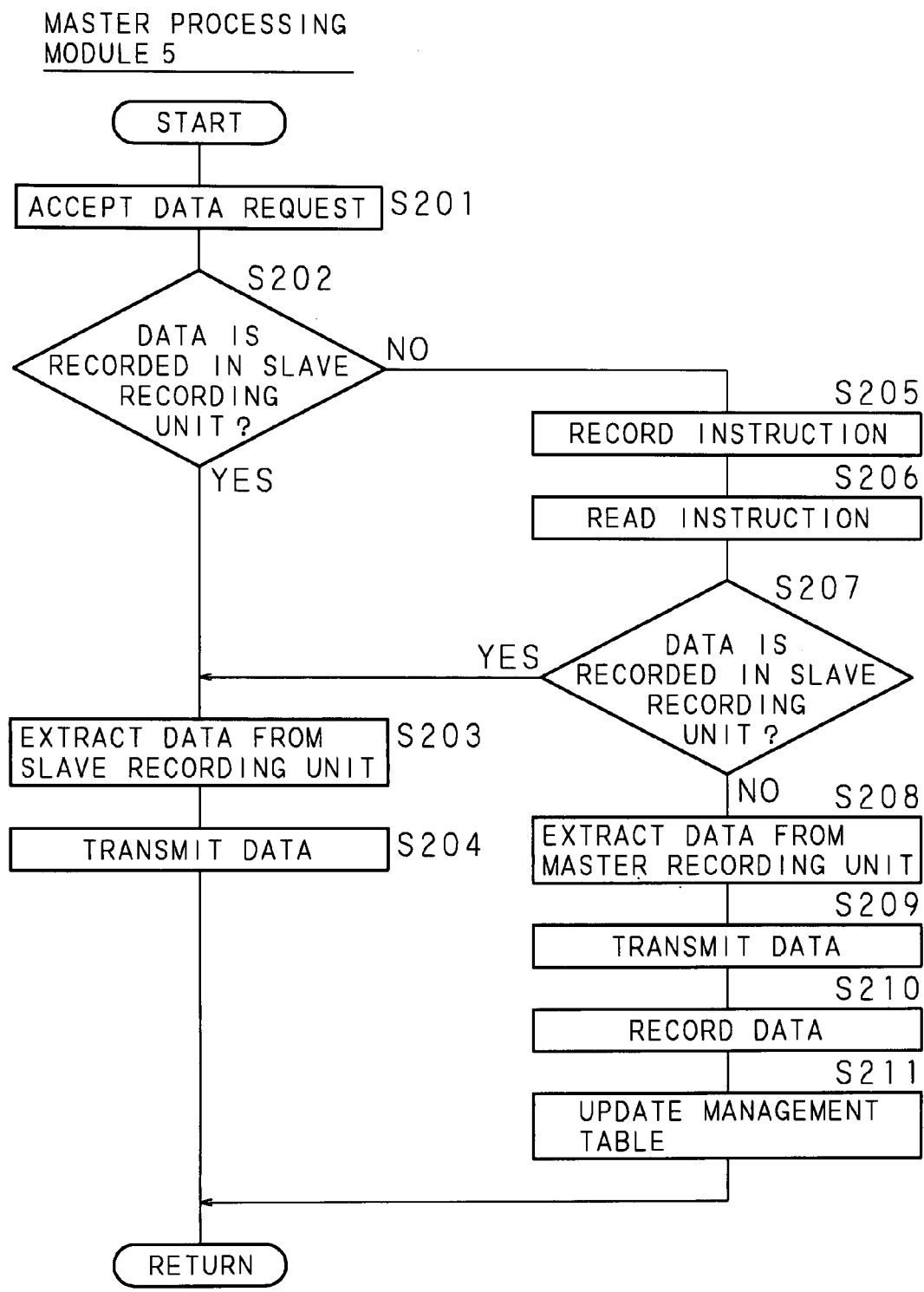
FIG. 6 is a flowchart showing an example of the processing of the master processing module included in the processing apparatus of the present invention.

FIG. 6 is a flowchart showing an example of the processing of the master processing module 5 included in the processing apparatus 1 of the present invention. The flowchart shown in FIG. 6 depicts the processing of the master processing module 5 at step S102 of FIG. 5.

The master processing module 5 accepts the data request from the slave processing module 6 having made the data request, through the control by the controlling unit 50 (S201), and determines whether the data to be accessed from the slave processing module 6 having made the data request is recorded in the slave recording unit 52 or not by referring to the information recorded in the management table 53 (S202).

When it is determined at step S202 that the data to be accessed is recorded in the slave recording unit 52 (S202: YES), the master processing module 5 extracts the data to be accessed, from the slave recording unit 52 through the control by the controlling unit 50 (S203), and transmits the extracted data from the connecting unit 54 to the slave processing module 6 having made the data request (S204).

When it is determined at step S202 that the data to be accessed is not recorded in the slave recording unit 52 (S202: NO), the master processing module 5 records the instruction based on the accepted data request in the register 50a as a queue through the control by the controlling unit 50 (S205). The instructions recorded in the register 50a are read and executed in the order in which they are recorded.

Then, the master processing module 5 reads the instruction associated with the data request recorded in the register 50a through the control by the controlling unit 50 (S206), and again determines whether the data associated with the read data request is recorded in the slave recording unit 52 or not (S207). This is done because there is a possibility that the contents recorded in the slave recording unit 52 are changed in the period from when the instruction is recorded into the register 50a to when the instruction is read at steps S205 and S206.

When it is determined at step S207 that the data to be accessed is recorded in the slave recording unit 52 (S207: YES), the master processing module 5 proceeds to the processing at step S203, and executes the processings at step S203 and succeeding steps in a similar manner to that described above through the control by the controlling unit 50.

At step S207, when it is determined at step S207 that the data to be accessed is not recorded in the slave recording unit 52 (S207: NO), the data to be accessed based on the data request is extracted from the master recording unit 51 (S208), and the extracted data is transmitted from the connecting unit 54 to the slave processing module 6 having made the data request (S209). Then, the data transmitted to the slave processing module 6 having made the data request is recorded in the slave recording unit 52 (S210), and the management table 53 is updated so that the recorded contents are reflected (S211). By the data being recorded in the slave recording unit 52 at step S210, the hit rate of the slave recording unit 52 which is a cache memory can be improved. Since the new data is recorded in the slave recording unit 52, there can be a case where some data must be deleted. In this case, the data to be deleted is selected based on the history such as when and how many times each piece of data was accessed in the past.

FIGS. 7A to 7F are explanatory views showing examples of a hit determination of the master processing module 5 included in the processing apparatus 1 of the present invention. FIGS. 7A to 7F show concrete examples of the determinations at steps S202 and S207 of FIG. 6.

The master processing module 5 is capable of recognizing the relation between the data recorded in the slave recording unit 52 and the memory addresses of the master recording unit 51 where the data is recorded and the relation between the data requested by the data request and the memory addresses of the master recording unit 51 where the data is recorded by referring to the management table 53. Therefore, the master processing module 5 is capable of determining whether the requested data is recorded in the slave recording unit 52 or not, that is, performing a hit determination by comparing the memory addresses.

In FIGS. 7A to 7F, the address range associated with the data requested by the data request is designated as a range A, and the address range associated with the data recorded in the slave recording unit 52 is designated as a range B. In FIGS. 7A to 7F, higher-order addresses are shown on the lower side, and lower-order addresses are shown on the upper side.

Figure 7A:
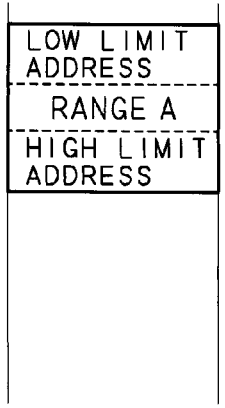
FIGS. 7A to 7F are explanatory views showing examples of a hit determination of the master processing module included in the processing apparatus of the present invention.

FIG. 7A shows, as Case 1, a case where the high limit address of the range A is situated below the low limit address of the range B. Case 1 results in a mishit because the requested data and the data recorded in the slave recording unit 52 completely disaccord with each other. Consequently, the master processing module 5 determines that the requested data is not recorded in the slave recording unit 52.

Figure 7D:
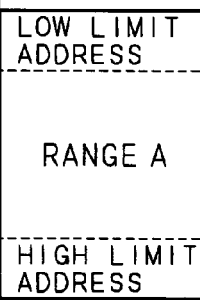
Figure 7B:
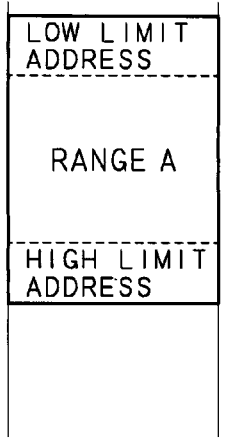

FIG. 7B shows, as Case 2, a case where the low limit address of the range A is situated below the low limit address of the range B, the high limit address of the range A is situated above the low limit address of the range B, and the high limit address of the range A is situated below the high limit address of the range B. Case 2 results in a mishit because it is impossible to extract all the data from the slave recording unit 52 although the requested data partly coincides with the data recorded in the slave recording unit 52. Consequently, the master processing module 5 determines that the requested data is not recorded in the slave recording unit 52.

Figure 7E:
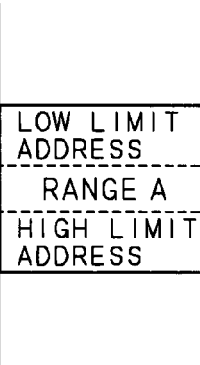
Figure 7C:
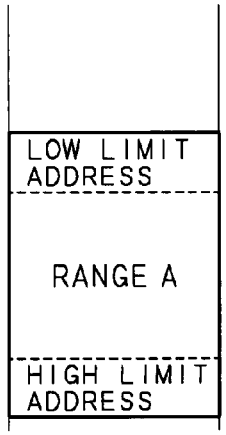

FIG. 7C shows, as Case 3, a case where the low limit address of the range A is situated above the low limit address of the range B, the high limit address of the range A is situated below the low limit address of the range B, and the high limit address of the range A is situated above the high limit address of the range B. Case 3 results in a mishit because it is impossible to extract all the data from the slave recording unit 52 although the requested data partly coincides with the data recorded in the slave recording unit 52. Consequently, the master processing module 5 determines that the requested data is not recorded in the slave recording unit 52.

FIG. 7D shows, as Case 4, a case where the low limit address of the range A is situated below the low limit address of the range B, and the high limit address of the range A is situated above the high limit address of the range B. Case 4 results in a mishit because it is impossible to extract all the data from the slave recording unit 52 although the requested data partly coincides with the data recorded in the slave recording unit 52. Consequently, the master processing module 5 determines that the requested data is not recorded in the slave recording unit 52.

FIG. 7E shows, as Case 5, a case where the low limit address of the range A is situated above the low limit address of the range B, and the high limit address of the range A is situated below the high limit address of the range B. Case 5 results in a hit because the requested data all coincides with the data recorded in the slave recording unit 52. Consequently, the master processing module 5 determines that the requested data is recorded in the slave recording unit 52. A case where the high limit address of the range A and the high limit address of the range B coincide with each other and the low limit address of the range A and the low limit address of the range B coincide with each other is also included in Case 5. In this case, the master processing module 5 determines that the requested data is recorded in the slave recording unit 52.

Figure 7F:

FIG. 7F shows, as Case 6, a case where the low limit address of the range A is situated above the high limit address of the range B. Case 6 results in a mishit because the requested data and the data recorded in the slave recording unit 52 completely disaccord with each other. Consequently, the master processing module 5 determines that the requested data is not recorded in the slave recording unit 52.

While the modules included in the processing apparatus 1 are arranged by forming the bus topology in the above-described embodiment, the present invention is not limited thereto, and may be developed to various modes such as the star topology.

Figure 8:
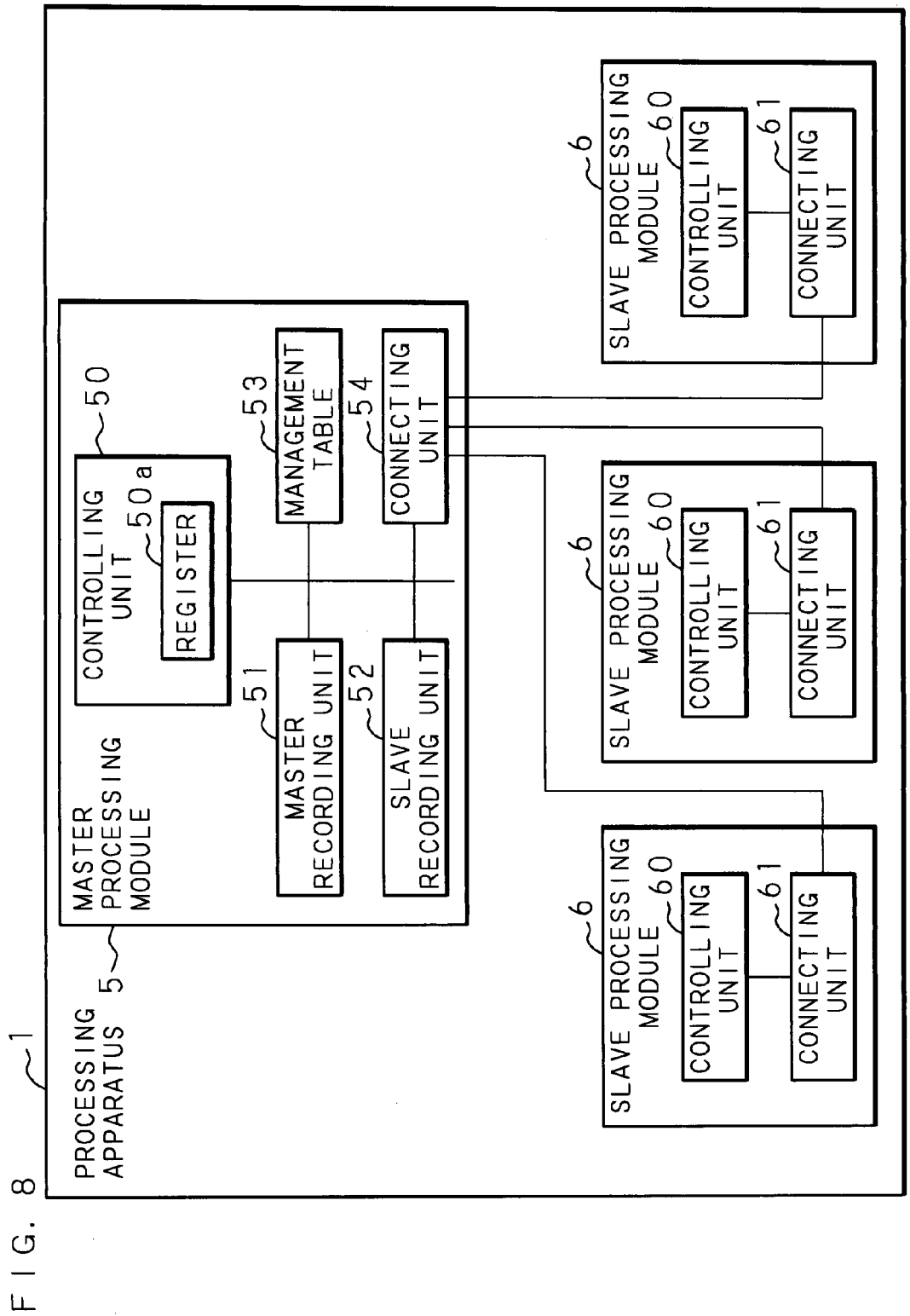
FIG. 8 is a block diagram conceptually showing an example of the structure of modules included in the processing apparatus of the present invention.

FIG. 8 is a block diagram conceptually showing an example of the structure of modules included in the processing apparatus 1 of the present invention. FIG. 8 shows a mode in which the master processing module 5 serves as the node as the center of the star topology being formed and a plurality of slave processing modules 6 are connected to the master processing module 5 by connection cables (links). By forming the processing apparatus 1 as the star topology, it never occurs that one slave processing module 6 monopolizes the bus when information is transmitted and received between the master processing module 5 and the slave processing modules 6, so that a plurality of slave processing modules 6 can simultaneously access the master processing module 5.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds there-of are therefore intended to be embraced by the claims.

What is claimed is:

1. A processing apparatus comprising:
   a master processing module; and
   a plurality of slave processing modules connected to the master processing module,
   wherein the master processing module includes:
   a master recording unit that records data required for processing; and
   a slave recording unit that records part of the data recorded in the master recording unit,
   each of the slave processing modules includes:
   an access unit that accesses the master processing module when it is necessary to access the data recorded in the master recording unit of the master processing module, and
   the master processing module further includes:
   a transmitting unit that transmits the data recorded in the slave recording unit to the slave processing module having accessed the master processing module when the data to be accessed from any of the plurality of slave processing modules is recorded in the slave recording unit.

2. The processing apparatus as set forth in claim 1, wherein the master processing module further includes:
   a transmitting unit which transmits, when the data to be accessed is not recorded in the slave recording unit, the data recorded in the master recording unit to the slave processing module having accessed the master processing module; and
   a recording unit which records in the slave recording unit the data having been transmitted to the slave processing module.

3. The processing apparatus as set forth in claim 1 further comprising:
   a table which records information associated with the data recorded in the slave recording unit; and
   a determination unit which determines whether the data to be accessed is recorded in the slave recording unit or not for the access from the salve processing module based on the information recorded in the table.

4. The processing apparatus as set forth in claim 1, wherein the processing apparatus is a base transceiver station communicating with a transceiver.

5. A processing module included in a processing apparatus and connected to a plurality of other processing modules through a connection cable, comprising:
   a master recording unit that records data required for processing;
   a slave recording unit that records part of the data recorded in the master recording unit; and
   a transmitting unit that transmits the data recorded in the slave recording unit to one of the other processing modules having accessed the processing module when the data to be accessed from any of the plurality of other processing modules is recorded in the slave recording unit.

6. The processing module as set forth in claim 5, further comprising:
   a transmitting unit which transmits, when the data to be accessed is not recorded in the slave recording unit, the data recorded in the master recording unit to the other processing module having made the access; and
   a recording unit which records in the slave recording unit the data having been transmitted to the other processing module.

7. The processing module as set forth in claim 5, further comprising:
   a table which records information associated with the data recorded in the slave recording means; and
   a determination unit which determines whether the data to be accessed is recorded in the slave recording unit or not for the access from the other processing module based on the information recorded in the table.

8. The processing module as set forth in claim 5, wherein the processing apparatus is a base transceiver station communicating with a transceiver.

* * * * *

UNITED STATES PATENT AND TRADEMARK OFFICE
CERTIFICATE OF CORRECTION

PATENT NO. : 7,694,052 B2  Page 1 of 1
APPLICATION NO. : 11/979270
DATED : April 6, 2010
INVENTOR(S) : Fuyuta Sato et al.

It is certified that error appears in the above-identified patent and that said Letters Patent is hereby corrected as shown below:

Column 10, Line 21, change "salve" to --slave--.

Signed and Sealed this

Sixth Day of July, 2010

David J. Kappos
*Director of the United States Patent and Trademark Office*